United States Patent [19]

Jackson et al.

[11] Patent Number: 4,662,171
[45] Date of Patent: May 5, 1987

[54] AUTOMATIC THRUST RESTORATION SYSTEM

[75] Inventors: Douglas O. Jackson, Mercer Island; Daniel R. Virnig, Bellevue, both of Wash.

[73] Assignee: The Boeing Company, Seattle, Wash.

[21] Appl. No.: 846,306

[22] Filed: Mar. 31, 1986

[51] Int. Cl.$^4$ .............................. F02C 6/00; F02C 9/00
[52] U.S. Cl. ...................................... 60/39.15; 60/233; 364/427
[58] Field of Search ................... 60/39.091, 39.15, 233, 60/235, 243; 244/53 R, 180, 182; 364/427, 431.02

[56] References Cited

U.S. PATENT DOCUMENTS

| | | | |
|---|---|---|---|
| 3,987,279 | 10/1976 | Borelan et al. | 60/39.15 |
| 4,019,702 | 4/1977 | Annin | 364/427 |
| 4,034,938 | 7/1977 | Borelan et al. | 60/39.15 |
| 4,546,353 | 10/1985 | Stockton | 60/39.15 |

*Primary Examiner*—Louis J. Casaregola
*Attorney, Agent, or Firm*—Christensen, O'Connor, Johnson & Kindness

[57] ABSTRACT

A system for automatically restoring thrust to the working engine(s) of an aircraft if power is lost by an engine while the aircraft is operating at reduced thrust during a takeoff noise abatement maneuver is disclosed. The automatic thrust restoration (ATR) system is activated when: (1) the automatic throttle (A/T) system of the aircraft is engaged; (2) the throttle hold mode of operation of the A/T (which occurs during the initial takeoff period) has ended; and, (3) engine thrust is reduced below a preset value (which indicates that the aircraft is making a noise abatement maneuver). When these three conditions exist, the ATR system is activated for a period of time adequate for the aircraft to climb at a reduced slope to a prescribed altitude (e.g., 1500 feet). During the period of time the ATR system is activated, engine thrust is monitored. If thrust from an engine is lost, the ATR system automatically increases the throttle setting and, thus, the thrust of the working engine(s). ATR system reliability is enhanced by embodying the ATR control functions in two forms—a software form and a hardware form. Reliability is further enhanced by continuously testing the ATR system during takeoff, up to an altitude below that at which engine thrust noise abatement reduction occurs (e.g., 500 feet). Test failure results in the ATR system being rendered inoperable.

9 Claims, 5 Drawing Figures

AUTOMATIC THRUST RESTORATION SYSTEM

TECHNICAL AREA

This invention relates to aircraft control systems and, more particularly, aircraft auto throttle thrust control systems.

BACKGROUND OF THE INVENTION

Many modern airports are located in high density residential areas. Because of the noise produced by modern commercial jet aircraft, some of the airports located in high density residential areas airports have imposed noise restrictions on aircraft operators. In order to meet these restrictions, noise abatement maneuvers have been devised. Noise abatement maneuvers require an aircraft to climb quickly to obtain as high an altitude as possible above the runway before leaving the immediate vicinity of the airport and, then, reduce thrust. While thrust reduction reduces noise, it also reduces the climb gradient of the aircraft. In some instances, the level of thrust reduction needed to meet the prescribed noise levels is below that required for an aircraft to continue to climb if one of its engines fails and thrust is not increased to the working engine(s). Obviously, the pilot can manually accomplish this result, i.e., increased thrust to the working engine(s) in the event of engine failure, provided the pilot promptly recognizes the loss of thrust from the failed engine. The major source of difficulty associated with relying solely on pilot response in the event of engine failure during takeoff while in a noise abatement maneuver is pilot work load. During takeoff, pilot work load is high. As a result, the likelihood of a pilot failing to promptly respond to the loss of engine thrust during a takeoff noise abatement is undesirably high. Hence, it would be desirable to provide an automatic system for increasing thrust to the working engine(s) during a takeoff noise abatement maneuver if thrust is lost from an engine. The present invention is directed to providing an automatic thrust restoration system that accomplishes this result.

SUMMARY OF THE INVENTION

In accordance with this invention, a system for automatically restoring thrust to the working engine(s) of an aircraft if power is lost by an engine while the aircraft is operating at reduced thrust during a takeoff noise abatement maneuver is provided. The automatic thrust restoration (ATR) system is activated when: (1) the automatic throttle (A/T) system of the aircraft is engaged; (2) the throttle hold mode of operation of the A/T system (which occurs during initial takeoff) has ended; and (3) engine thrust is reduced below a preset value (which indicates that a noise abatement maneuver is occurring). When these three conditions exist, the ATR system is activated for a period of time adequate for the aircraft to climb at a reduced slope to a prescribed altitude (e.g., 1500 feet). During the period of time that the ATR system is activated, it monitors engine thrust. If thrust from an engine is lost, the ATR system automatically causes the thrust of the working engine(s) to increase.

In accordance with further aspects of this invention, the ATR system includes a software based subsystem and a hardware based subsystem, each of which senses the three prescribed conditions during the activation of the ATR system. The outputs of the software based subsystem and the hardware based subsystem are cross-coupled such that either system can cause the thrust of the working engine(s) to increase in the event of engine failure. Thus, ATR system redundancy is provided.

In accordance with further aspects of this invention, ATR system reliability is further enhanced by testing the ATR system during takeoff, up to an altitude below the altitude at which engine thrust noise abatement reduction occurs (e.g., 500 feet). Test failure results in the related subsystem of the ATR system being rendered inoperable.

In accordance with further aspects of this invention, the ATR system includes sensing means for sensing the loss of electric power created by the engine that normally supplies electric power to the A/T system. In the event of loss of electric power produced by the normal engine, the system automatically switches the A/T system so that it receives electric power created by the working engine. Preferably, the circuit that controls power switching is also automatically tested.

As will be appreciated from the foregoing description, the invention provides an automatic thrust restoration system designed to increase the thrust to a working engine(s) in the event of failure of an engine during takeoff when a noise abatement maneuver is taking place, without operator intervention.

BRIEF DESCRIPTION OF THE DRAWINGS

The foregoing and other features and advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
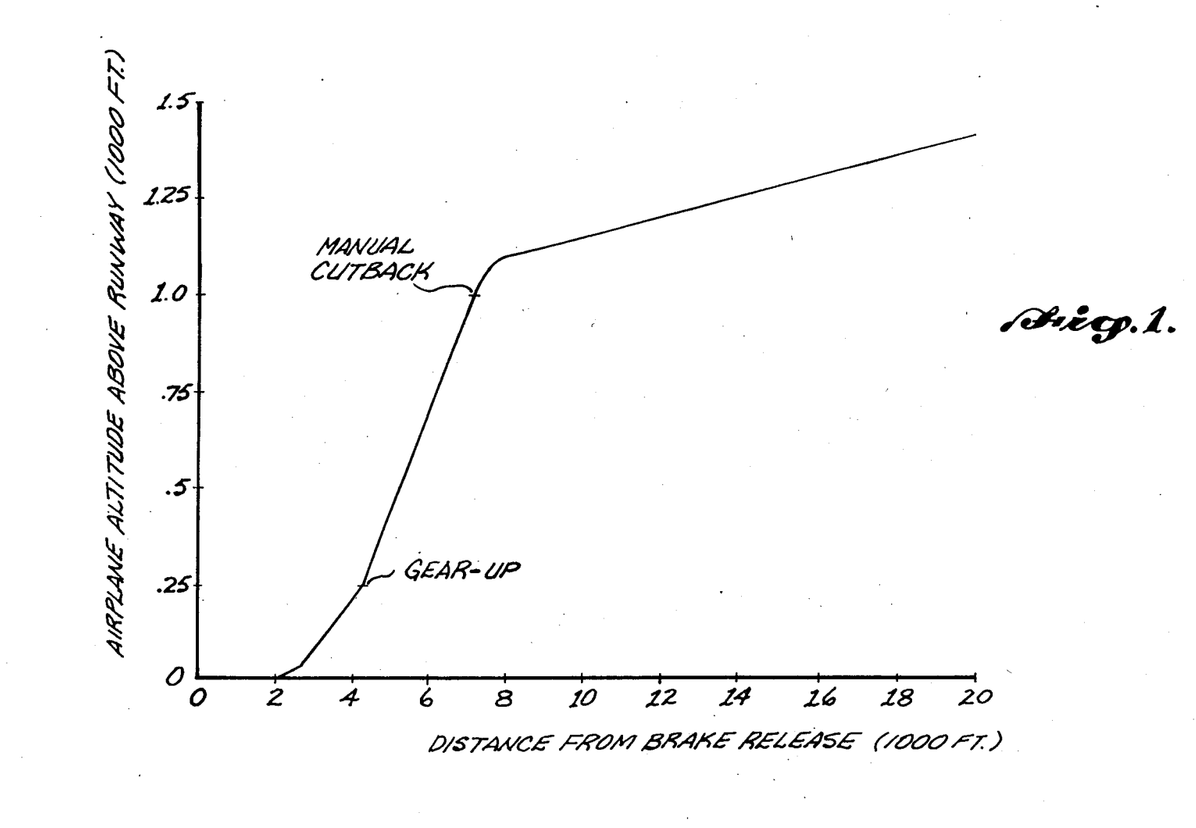
FIG. 1 is a diagram illustrating the takeoff flight path of an aircraft during a typical noise abatement maneuver.

FIG. 1 is a Cartesian coordinate diagram illustrating an aircraft flight path during a typical noise abatement maneuver. The distance traveled by the aircraft from the takeoff brake release point is shown on the ordinate and the altitude of the aircraft above the runway is shown on the abscissa. As shown in FIG. 1, shortly after takeoff, the gear of the aircraft is raised. This occurs at approximately 250 feet. Thereafter, while still in the immediate vicinity of the airport, the aircraft climbs quickly to a minimum altitude (e.g., 1000 feet). Then, thrust is reduced to reduce noise. When this occurs, the climb rate of the aircraft decreases. As a result, the aircraft climbs slowly to a higher altitude (e.g., 1500 feet). It is during the last section of the illustrated flight path that the automatic thrust restoration (ATR) system of the invention is made operable, e.g., engaged. More specifically, as noted above, if thrust from an engine is lost during the slow climb section of the flight path illustrated in FIG. 1, the thrust from the remaining working engine(s) may not be adequate to achieve a positive climb gradient. The invention avoids this result by automatically advancing the throttle and, thus, the thrust of the working engine(s) so that an aircraft follows the climb gradient adequate for the aircraft to "go around" and land.

Figure 2:
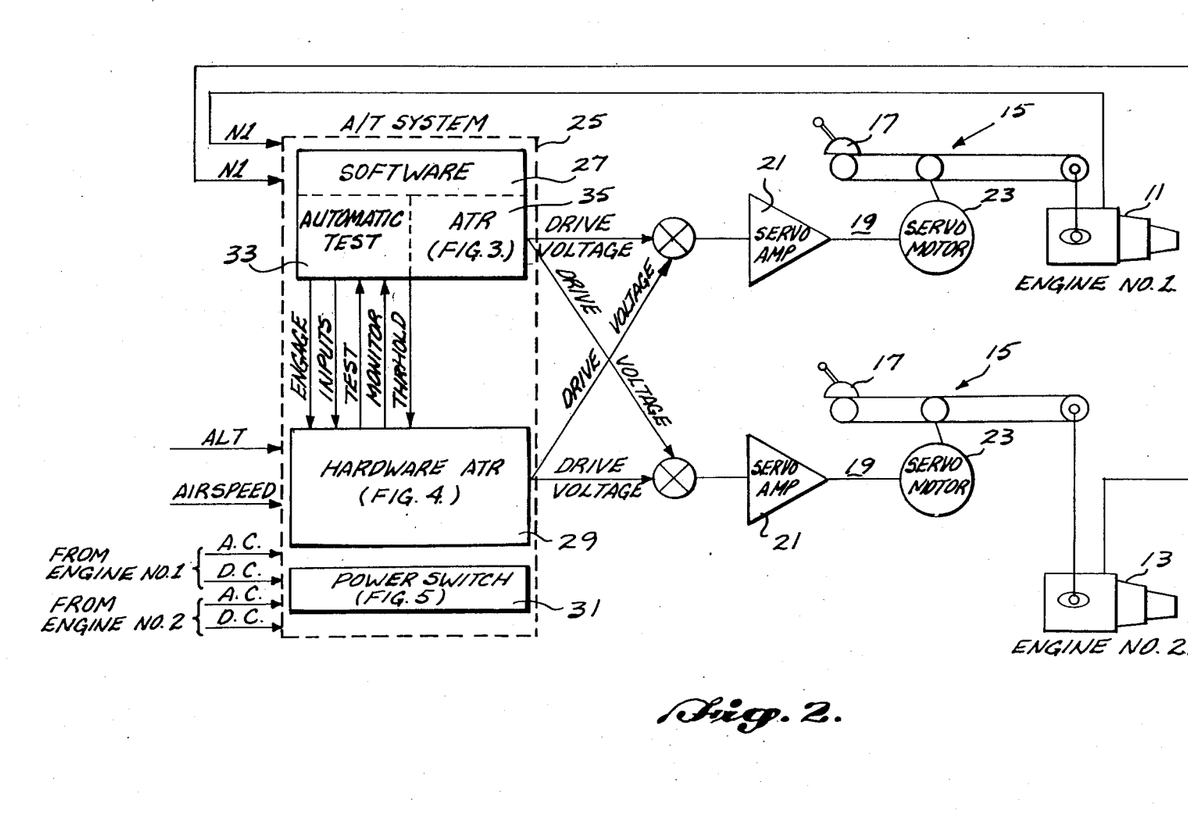
FIG. 2 is a partially block and partially schematic diagram illustrating a preferred embodiment of an ATR system formed in accordance with the invention.

FIG. 2 is a partially pictorial and partially block diagram illustrating the preferred embodiment of an ATR system formed in accordance with the invention. As illustrated in FIG. 2, and described more fully below, preferably, an ATR system formed in accordance with the invention is embodied as an integral part of the automatic throttle (A/T) computer system of the aircraft.

FIG. 2 illustrates first and second jet engines 11 and 13. Connected to each engine is a throttle control system 15. Each of the throttle control systems includes a pilot actuator 17 and a power actuator 19. The illustrated power actuators 19 include a servoamplifier 21 and a servomotor 23. The pilot actuator 17 allows the pilot to manually control the amount of fuel applied to the engines 11 and 13 and, thus, the thrust produced by the engines. The power actuator 19 allows electrical control signals to control the application of fuel to the engines 11 and 13. The coupling between the pilot actuators 17, the power actuators 19 and the engine throttles is illustrated pictorially by coupling lines in FIG. 2. Since these elements and jet engines 11 and 13 are well known to those in the jet propulsion art and do not form a portion of the present invention, they are not described further here.

Also illustrated in FIG. 2 is an auto throttle (A/T) system 25. As will be readily appreciated by those familiar with A/T systems, such systems are commonly used in modern jet aircraft to control the application of fuel to the engines of a jet aircraft in order to control engine thrust. As shown in FIG. 2, preferably an ATR system formed in accordance with the invention is integrally embodied in the A/T system 25. For ease of illustration, the ATR portion of the A/T system 25 is illustrated in FIG. 2. As will be readily understood, the A/T system of an actual aircraft will include software and hardware in addition to the ATR software and hardware illustrated and described herein.

The ATR system illustrated in FIG. 2 includes a software subsystem 27, a hardware ATR subsystem 29 and a power switch 31. In a conventional manner, the A/T system 25 receives N1 signals from the first and second engines 11 and 13. As will be readily understood by those familiar with jet engines, N1 signals contain information about the magnitude of the thrust produced by their respective engines. It is to be understood that use of N1 signals is for illustration purposes only since other types of signals denoting engine thrust are produced by other types of engines. The important point to note is that the A/T system 25 continuously receives a signal from each engine that denotes the thrust produced by the engine.

The A/T system 25 also receives an altitude signal representative of the aircraft's altitude and a calibrated airspeed signal representative of the aircraft's airspeed. Further, the A/T system is connected to the AC and DC power buses of the electric generators that are powered by the first and second engines 11 and 13.

As illustrated in FIG. 2, the software subsystem 27 includes an automatic test portion 33 and an ATR portion 35. The automatic test portion may form a portion of the automatic test section of the software of the overall A/T system. In addition to automatically testing the operation of the software subsystem 27, the automatic test portion 33 tests the hardware ATR 29 by applying input signals thereto and detecting the results created by said input signals in the manner illustrated in FIG. 4. In addition, the automatic test portion 33 tests the power switch 31 in the manner illustrated in FIG. 5.

Figure 3:
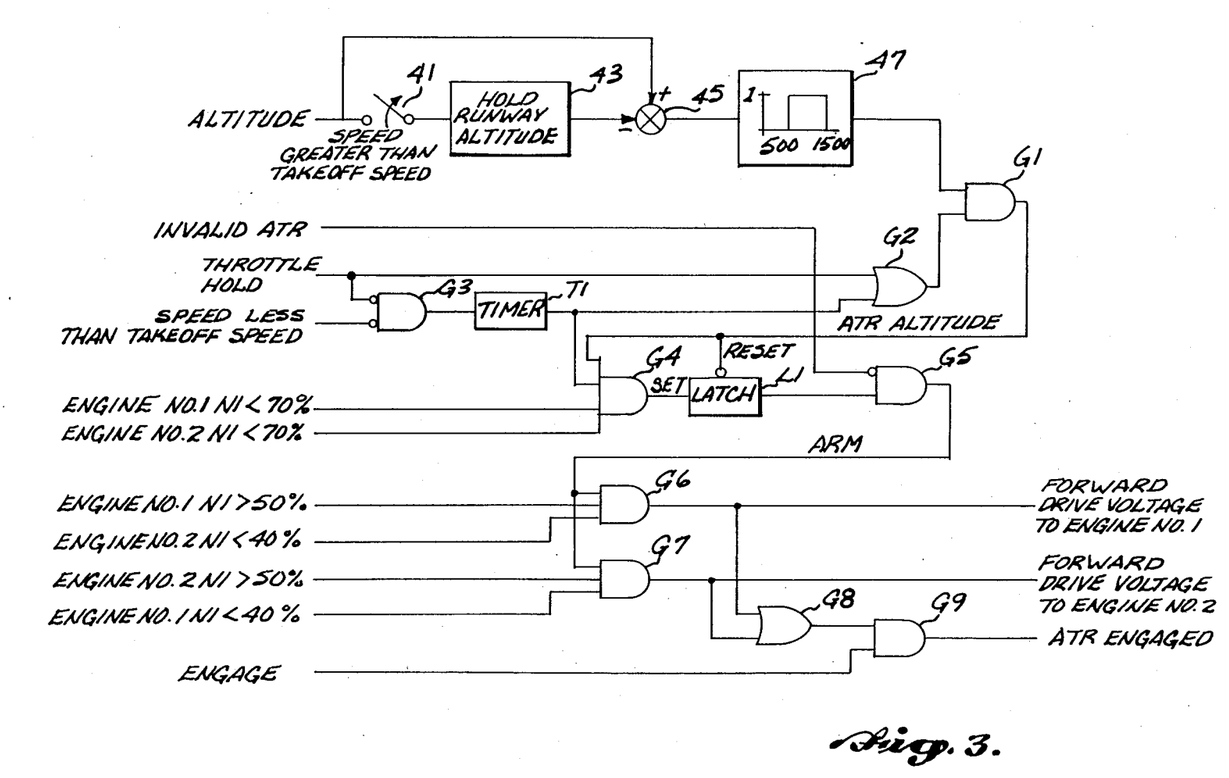
FIG. 3 is a logic diagram illustrating the software subsystem of the ATR system illustrated in FIG. 2.

The ATR portion 35 of the software subsystem 27 of the automatic thrust restoration system of the invention shown in FIG. 2 is illustrated in logic form in FIG. 3. It is to be understood that the logic form is used for ease of illustration only. An actual software implementation may vary from the logic form shown in FIG. 3 depending upon the nature of the chosen software. The altitude signal received by the A/T system 25 is applied through a logic switch 41 to a memory location depicted by a hold runway altitude location box 43. The logic switch 41 is closed when the airspeed of the aircraft is below the takeoff speed of the aircraft and open when the airspeed of the aircraft is above takeoff speed. For example, the switch may be held closed when the airspeed of the aircraft is below 60 knots and held open when the airspeed of the aircraft is above 60 knots for an aircraft having a nominal takeoff speed above 60 knots. As a result, the altitude signal stored in the hold runway altitude box 43 is the altitude of the runway from which the aircraft is taking off. The hold runway altitude signal is applied to a negative input of a two-input summer 45. The altitude signal is applied to a positive input of the two-input summer 45. As a result, the output of the two-input summer 45 is the difference between the altitude of the runway and the altitude of the aircraft or, more specifically, the height of the aircraft above the runway.

The output of the two-input summer 45 is continuously analyzed by the ATR software to determine if the height of the aircraft above the runway is above a first value but below a second value. This function is illustrated by an analysis block 47 in FIG. 1. In the illustrated embodiment of the invention, the first or lower value is 500 feet and the second or higher value is 1500 feet. When the height above the runway as represented by the output of the summer 45 is between these two values, the output of the analysis block 47 is high. If the aircraft is below 500 feet or above 1500 feet, the output of the analysis block 47 is low. The output of the analysis block 47 is applied to one input of a first two-input AND gate designated G1.

The software subsystem illustrated in logic form in FIG. 2 also receives a THROTTLE HOLD signal produced by other software of the A/T system in a conventional manner. More specifically, as will be readily appreciated by those skilled in the aircraft art, a THROTTLE HOLD signal is produced by an A/T system during takeoff. During takeoff, the THROTTLE HOLD signal maintains the throttles of the aircraft at a preset level from when the aircraft reaches a predetermined speed (normally the engine power set speed of the aircraft, e.g., 60 knots) until the aircraft reaches a predetermined height, e.g., 400 feet. During this period of time, the THROTTLE HOLD signal is high. After the aircraft reaches the predetermined height, the THROTTLE HOLD signal shifts low. As shown in FIG. 3, the THROTTLE HOLD signal is applied to one input of a first two-input OR gate designated G2 and to an inverted input of a second-two-input AND gate designated G3.

The software subsystem illustrated in FIG. 3 also receives an airspeed signal, designated SPEED LESS THAN TAKEOFF SPEED. When the airspeed of the aircraft is less than takeoff speed, for example, when the airspeed of the aircraft is less than 60 knots, the SPEED LESS THAN TAKEOFF SPEED signal is high. When the airspeed of the aircraft exceeds the takeoff speed, this signal shifts low. The SPEED LESS THAN TAKEOFF SPEED signal is applied to a second inverted input of G3. As a result, the output of G3 shifts from a low state to a high state when the THROTTLE HOLD signal is low and when the speed of the aircraft is greater than its takeoff speed.

The output of G3 is applied to the trigger input of a timer designated T1. When triggered by the output of G3 shifting from a low state to a high state, the output of T1 shifts from low to high and remains high for a predetermined period of time, 100 seconds, for example.

The output of T1 is applied to the second input of G2. The output of G2 is applied to the second input of G1. Consequently, the output of G1 is high when the aircraft is between 500 and 1500 feet above the runway, provided that either the THROTTLE HOLD signal is present or, if the THROTTLE HOLD signal has ended, T1 has not timed out. The output of G1, which is denoted as an ATR ALTITUDE signal in FIG. 3, is applied to the first input of a four-input AND gate designated G4 and to the reset input of a latch designated L1. The output of T1 is connected to a second input of G4. G4 receives two additional signals—one designated ENGINE NO. 1 N1<70% and the second designated ENGINE NO. 2 N1<70%. These signals are high when the noted condition is present and low when the noted condition is not present. More specifically, if the throttles of the engines are set such that the RPM produced by the engines as defined by N1 is 70% which represents the maximum engine thrust level needing automatic thrust restoration activation, the ENGINE NO. 1 N1<70% and the ENGINE NO. 2 N1<70% inputs of G4 are high. If the throttles of the engines are set such that engine RPM is above 70% maximum, these inputs to G4 are low. As a result, the output of G4 is high if and only if: (1) the output of G1 is high; (2) T1 has not timed out; and, (3) the RPM produced by both engines is less than 70%. Since the output of G4 is applied to the set input of L1, L1 is set only if the foregoing conditions exist. The output of L1 that shifts to a high state when L1 is set is applied to one input of a third two-input AND gate designated G5.

If the testing of the A/T software determines that the software, particularly the ATR software, is functioning incorrectly, an INVALID ATR signal is produced by the A/T software. The INVALID ATR signal is applied to the second input of G5, which is logically inverted. Thus, as long as the INVALID ATR signal is in its normal low state, G5 is enabled to apply the output of L1 to one input of each of two three-input AND gates designated G6 and G7. If the INVALID ATR signal is high, denoting that the software tests have found the software to be functioning incorrectly, G5 is disabled and the G5 inputs of G6 and G7 remain low regardless of the state of the output of L1.

The second input of G6 is a signal denoted ENGINE NO. 1 N1>50%. The ENGINE NO. 1 N1>50% signal is low when the RPM of ENGINE NO. 1 is less than 50%, which indicates the lowest thrust level available for automatic thrust restoration operation. When the thrust of ENGINE NO. 1 as denoted by N1 exceeds 50% N1 N1, this signal is high. The third input of G6 is a signal denoted ENGINE NO. 2 N1<40%. The ENGINE NO. 2 N1<40% signal which is used as an engine failure indicator, is high when the RPM produced by ENGINE NO. 2 is less than 40% of its maximum value. If the RPM produced by ENGINE NO. 2 is greater than 40% of its maximum value, this signal is low. As a result, the output of G6 is high if and only if: (1) the output of G5 (which is a signal designated ARM to denote that the ATR system is activated) is high; (2) the RPM produced by ENGINE NO. 1 is greater than 50% of its maximum value (which indicates that ENGINE NO. 1 is working); and, (3) the thrust produced by ENGINE NO. 2 is less than 40% of its maximum value (which indicates that ENGINE NO. 2 has failed).

The second and third inputs of G7 are similar to the second and third inputs of G6, except from the opposite engines. More specifically, the second input of G7 is a signal designated ENGINE NO. 2 N1>50%. This signal is low when the RPM produced by ENGINE NO. 2 is less than 50% of its maximum value and high when the RPM produced by ENGINE NO. 2 is greater than 50% of its maximum value. The signal applied to the third input of G7 is designated ENGINE NO. 1 N1<40%. This signal is high when the RPM produced by ENGINE NO. 1 is less than 40% of its maximum and low when the thrust produced by ENGINE NO. 1 is greater than 40% of its maximum.

The output of G6 is a signal designated FORWARD DRIVE VOLTAGE to ENGINE NO. 1 and the output of G7 is a signal designated FORWARD DRIVE VOLTAGE to ENGINE NO. 2. These signals are used to cause the throttles of the working engine(s) to advance (if an engine failure occurs during a takeoff noise abatement maneuver) in the manner illustrated in FIG. 2 and described below.

In summary, the output of G6 (the FORWARD DRIVE VOLTAGE TO ENGINE NO. 1 signal) is high if and only if: (1) the aircraft is between 500 and 1500 feet above the runway; (2) the THROTTLE HOLD signal has ended and T1 has not timed out; (3) the RPM of both engines is below 70% of their maximum value (which indicates that a noise abatement maneuver is occurring); (4) the RPM of the second engine 13 is below 40% (which indicates that the second engine has failed); and, (5) the RPM of the first engine 11 is above 50% (which indicates that the first engine is working). The high state of the FORWARD DRIVE VOLTAGE TO ENGINE NO. 1 causes the thrust of the first engine 11 to increase to compensate for the loss of thrust from the second engine 13. Similarly, the output of G7 (the FORWARD DRIVE VOLTAGE TO ENGINE NO. 2 signal) is high if and only if: (1) the aircraft is between 500 and 1500 feet above the runway; (2) the THROTTLE HOLD signal has ended and T1 has not timed out; (3) the RPM of both engines is below 70% of their maximum value; (4) the RPM of the first engine 11 is below 40%; and, (5) the RPM of the second engine 13 is above 50%. In this case, the high state of the FORWARD DRIVE VOLTAGE TO ENGINE NO. 2 causes the thrust of second engine 13 to increase to compensate for the loss of thrust from the first engine 11.

The outputs of G6 and G7 are each applied to one input of second two-input OR gate designated G8. The output of G8 is connected to one input of a fourth two-input AND gate designated G9. The second input of G9 receives a signal denoted ENGAGE. The ENGAGE signal is high when the A/T system is engaged by the pilot. The output of G9 is a signal designated ATR engaged. Consequently, the ATR ENGAGED signal is high when the A/T system is engaged and when one of the FORWARD DRIVE VOLTAGE signals shifts to a high state. The ATR engaged signal can be used to control an ATR audio and/or visual display designed to advise the pilot that the ATR system has been activated as a result of an engine thrust loss during a takeoff noise abatement maneuver.

Figure 4:
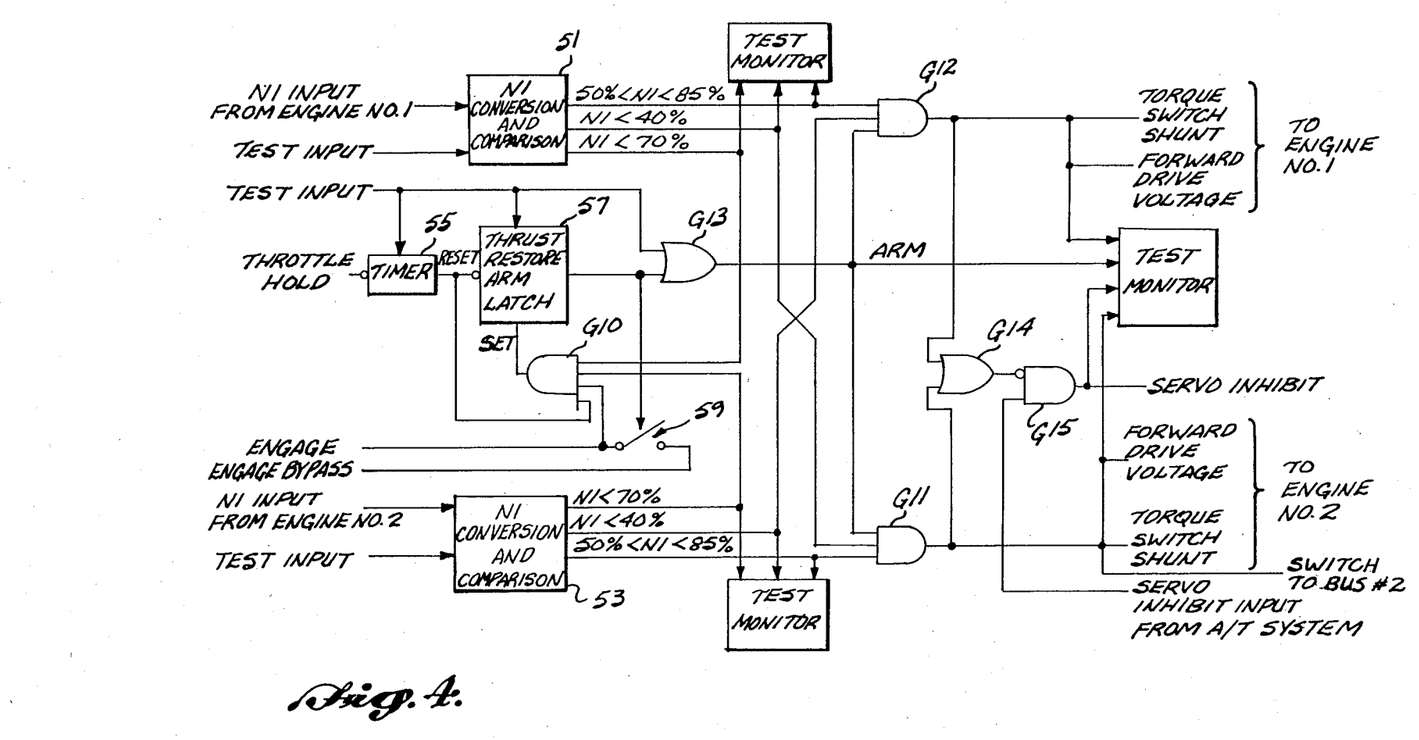
FIG. 4 is a logic diagram of the hardware subsystem of the ATR system illustrated in FIG. 2.

FIG. 4 is a logic diagram of a hardware ATR subsystem suitable for use in the embodiment of the invention illustrated in FIG. 2. In addition to receiving N1 inputs from the first and second engines 11 and 13, the hardware ATR subsystem illustrated in FIG. 4 receives: (1) a THROTTLE HOLD signal from and, A/T hardware; (2) test inputs from the automatic test portion 33 of the ATR software; and, (3) the ENGAGE signal produced when the A/T system is engaged by the pilot. Further, FIG. 4 includes a variety of the signal lines connected to several blocks denoted test monitor. The test monitor blocks functionally depict parts of the automatic test portion 33 of the software subsystem 27 of the ATR.

The hardware ATR subsystem illustrated in FIG. 4 includes first and second N1 conversion and comparison circuits 51 and 53. The N1 signal produced by the first engine 11 is applied to the signal input of the first N1 conversion and comparison circuit 51 and the N1 signal produced by the second engine 13 is applied to the signal input of the second N1 conversion and comparison circuit 53. The inputs of both circuits are also connected to receive TEST INPUT signals. The first and second N1 conversion and comparison circuits 51 and 53 convert the N1 signals they receive into a form suitable for comparison. For example, the N1 signals may be converted from pulse form to voltage form and compared with reference voltages to control the high/low state of the noted output signals. More specifically, each of the first and second N1 conversion and comparison circuits 51 and 53 produces three output signals. The output signals are either in a low state or a high state depending upon whether the designated condition is present. The three conditions are: (1) $N1<70\%$, meaning that the RPM of the related engine is less than 70% of the engine's maximum value; (2) $N1<40\%$, meaning that the RPM of the related engine is less than 40% of the engine's maximum value; and, (3) $50\%<N1<85\%$, meaning that the RPM of the related engine is greater than 50% of its maximum value but less than 85% of its maximum value. The purpose of the range up to 85% N1 is to remove the forward command when N1 is at 85% since this represents adequate thrust on the operating engine to meet positive climb gradient requirements.

The $N1<70\%$ outputs of the first and second N1 conversion and comparison circuits 51 and 53 are each applied to one input of a four-input AND gate designated G10. The $N1<70\%$ outputs are also connected to test monitor blocks. The $N1<40\%$ output of the first N1 conversion and comparison circuit 51 is connected to a test monitor block and to one input of a first three-input AND gate designated G11. The $N1<40\%$ output of the second N1 conversion and comparison circuit 53 is connected to a test monitor block and to one input of a second three-input AND gate designated G12. The $50\%<N1<85\%$ output of the first N1 conversion and comparison circuit 51 is connected to a test monitor block and to the second input of G12. The $50\%<N1<85\%$ output of the second N1 conversion and comparison circuit 53 is connected to a test monitor block and to the second input of G11.

The THROTTLE HOLD signal is applied to a timer 55. The timer is triggered when the THROTTLE HOLD signal shifts from a high state to a low state, which denotes the termination of the throttle hold period of the takeoff cycle. As noted above, this occurs when the aircraft exceeds a minimum altitude, such as 400 feet above the runway. The timer runs for a predetermined period of time—100 seconds, for example. During this period of time, the output of the timer is in a high state. The output of the timer 55 is connected to the reset input of a thrust restore arm latch 57 and to the third input of G10. The thrust restore arm latch 57 is reset when the output of the timer 55 shifts from a high state to a low state.

The ENGAGE signal is applied to the fourth input of G10. The ENGAGE signal is also applied through a switch 59 to create an output signal denoted ENGAGE BYPASS. The ENGAGE BYPASS signal is applied to the A/T system in a manner that prevents software from automatically disengaging the hardware ATR system (by interrupting the ENGAGE circuit) when the switch is closed.

The output of G10 is applied to the set input of the thrust arm restore latch 57. The output of the thrust restore arm latch that shifts from a low state to a high state when the thrust restore arm latch is set is used to control the state of the switch 59. More specifically, when the output of the thrust restore arm latch 57 is low, switch 59 is open and when the output of thrust restore arm latch 57 is high, switch 59 is closed.

The output of the thrust restore arm latch 57 is also applied to one input of a first two-input OR gate designated G13. The other input of the first two-input OR gate is connected to receive a TEST INPUT signal. The timer 55 and the set input of the thrust restore arm latch 57 are also connected to receive TEST INPUT signals. Thus, each of these items can be independently actuated, or bypassed during a test sequence run by the automatic test portion 33 of the ATR software subsystem 27. The output of G13, which is a signal designated ARM, is applied to the third input of each of G11 and G12 and to a test monitor block.

As will be readily appreciated from the foregoing description, gates G11 and G12 of the hardware ATR subsystem illustrated in FIG. 4 perform the same function as gates G6 and G7 of the ATR software subsystem illustrated in FIG. 3. More specifically, G11 and G12 are enabled by the ARM signal after the THROTTLE HOLD signal has ended provided that: (1) the timer 55 has not timed out; (2) the A/T system is engaged; and, (3) the RPM of both engines is less than 70% of the engine's maximum value. When enabled, the outputs of G11 and G12 switch from a low state to a high state if the RPM of one of the engines drops below 40% of its maximum value and the RPM of the other engine is greater than 50% of its maximum value, but less than 85% of its maximum value. Which particular gate, e.g., G11 or G12, produces a high output signal, depends upon which of the two engines is below 40% and which of the two engines lies between 50% and 85%. As noted above, a drop in RPM below 40% is taken as an indication of a failed engine, provided the thrust of the other engine is above 50%.

The output of G11 is a signal designated FORWARD DRIVE VOLTAGE that is applied to ENGINE NO. 2 and the output of G12 is a signal designated FOR- WARD DRIVE VOLTAGE that is applied to ENGINE NO. 1. The signals are also applied to a test monitor block. The output of G11 is also a signal designated TORQUE SWITCH SHUNT, which is also applied to ENGINE NO. 1; and, the output of G12 is also a signal designated TORQUE SWITCH SHUNT and is also applied to ENGINE NO. 2. The TORQUE SWITCH SHUNT signals cause the torque switch of the servomotors of the related engine to be shunted (e.g., bypassed) if the particular servomotors being used with an actual embodiment of the invention have torque switches (or some other operative element) that needs to be bypassed when the ATR system of the invention is engaged in order to assure reliable throttle drive. Finally, the output of G11 is a SWITCH TO BUS 2 signal that is used by the power switch circuit (FIG. 5) in the manner hereinafter described.

The outputs of G11 and G12 are each connected to one input of a second two-input OR gate designated G14. The output of G14 is connected to an inverted input of a two-input AND gate designated G15. A SERVO INHIBIT INPUT FROM A/T SYSTEM signal is applied to the second input of G15. The SERVO INPUT FROM A/T SYSTEM signal is an A/T software created signal that inhibits servo motion. The output of G15 is a signal denoted SERVO INHIBIT OUTPUT. The SERVO INHIBIT OUTPUT signal is applied to a test monitor block and to a servo inhibit control input of the servomotors 23 of the throttle power actuators 19. Thus, G15 prevents the SERVO INHIBIT INPUT FROM A/T SYSTEM signal from being applied to the servos when the output of G14 is high, which occurs when the output at either G11 or G12 is high. As previously discussed, the outputs of G11 and G12 only go high when the A/T system is engaged, no test failure has occurred, the aircraft is in a noise abatement maneuver and an engine failure occurs.

Figure 5:
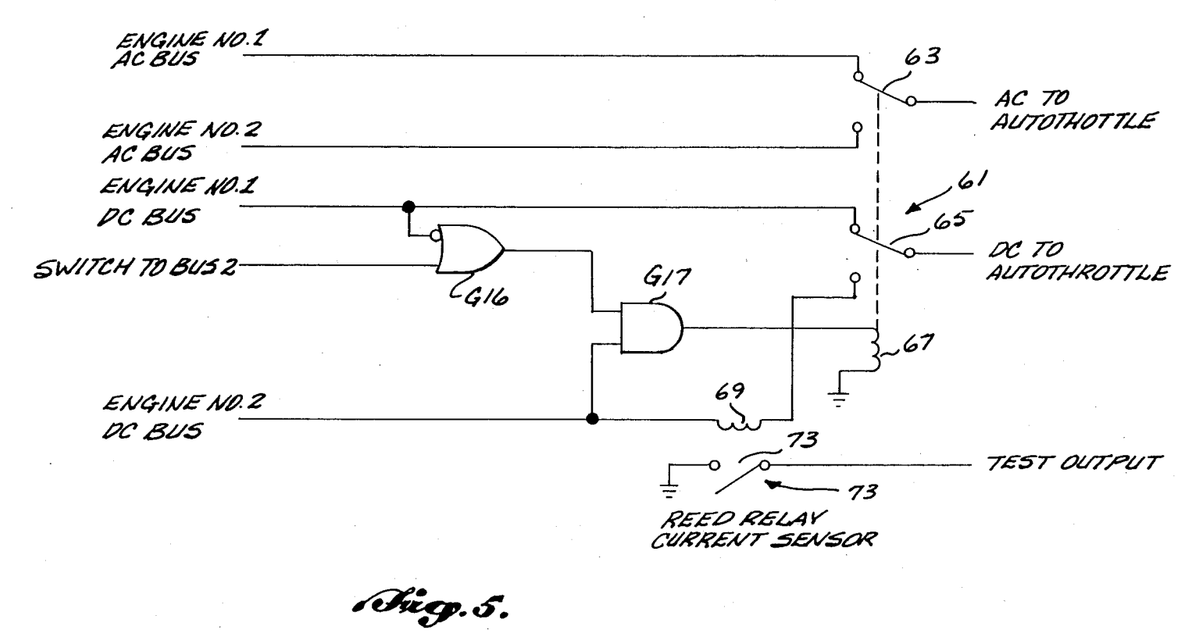
FIG. 5 is a schematic diagram of the power switch of the ATR system illustrated in FIG. 2.

FIG. 5 is a schematic diagram of a power switch circuit suitable for use in the embodiment of the invention illustrated in FIG. 1. The power switch circuit illustrated in FIG. 5 is connected to the AC and DC buses of the electric generators that are powered by the first and second engines 11 and 13. The power switch circuit illustrated in FIG. 5 includes a power transfer relay 61 having two sets of single-pole, double-throw switch contacts 63 and 65 and a coil 67. The AC bus of ENGINE NO. 1 is connected to the normally closed remote contacts of the first set of single-pole, double-throw contacts 63 and the AC bus of ENGINE NO. 2 is connected to the normally open remote contact of the same set of single-pole, double-throw contacts. The common terminal of the first set of single-pole, double-throw contacts 63 is connected to the AC power bus of the A/T system. The DC bus of ENGINE NO. 1 is connected to the normally closed remote contacts of the second set of single-pole, double-throw contacts 65. The DC bus of ENGINE NO. 2 is connected through the sense coil 69 of a reed relay current sensor 71 to the normally open remote terminal of the second set of single-pole, double-throw contacts 65. The common terminal of the second set of single-pole, double-throw contacts 65 is connected to the DC power bus of the A/T system.

The DC bus of ENGINE NO. 1 is also connected to an inverted input of a two-input OR gate designated G16. A test signal designated SWITCH TO BUS 2 is connected to a second input of G16. The output of G16 is connected to one input of a two-input AND gate designated G17. The DC bus of ENGINE NO. 2 is connected to the second input of G17. The output of G17 is connected through the coil 67 of the power transfer relay 61 to ground. Finally, the contacts 73 of the reed relay current sensor 71 are connected between ground and a test output terminal.

In operation, while the first engine 11, e.g., ENGINE NO. 1, is operating satisfactorily, the DC voltage on the DC bus of ENGINE NO. 1 causes the inverted input of G16 to be high. As a result, the output of G16 is low. Unless a test is being performed or a bus switch is commanded, the SWITCH TO BUS 2 signal is in its quiescent state, which is normally low. As a result, the output of G17 is low. Hence, the coil 67 of the power relay 61 is deenergized. As a result, the normally closed contacts of the first and second sets of single-pole, double-throw contacts 63 and 65 of the power transfer relay 61 are connected to their respective common contacts. Thus, the AC bus of ENGINE NO. 1 is connected to the AC bus of the A/T system and the DC bus of ENGINE NO. 1 is connected to the DC bus of the A/T system.

When an engine failure occurs, electrical power on one bus may be lost if the airplane's automatic bus transfer system fails to maintain power on both busses. Thus, if ENGINE NO. 1 fails, the voltage on the DC bus of ENGINE NO. 1 may also fail and drop low. When the failure of ENGINE NO. 1 is detected and a FORWARD DRIVE VOLTAGE command signal is sent to ENGINE NO. 2 (FIG. 6), the SWITCH TO BUS 2 signal causes the output of G16 to shift to a high state. If power is present on the output of the DC bus of ENGINE NO. 2, the output of G17 then shifts from a low state to a high state. When the output of G17 shifts from a low state to a high state, the coil 67 of the power transfer relay 61 is energized. Consequently, the normally open contacts of the first and second sets of single-pole, double-throw contacts 63 and 65 of the power transfer relay are connected to their respective common contacts. Thus, the AC bus of ENGINE NO. 2 is connected to the AC bus of the A/T system and the DC bus of ENGINE NO. 2 is connected to the DC bus of the A/T system, which assures that power will be available to the A/T system to advance the throttle of ENGINE NO. 2 when ENGINE NO. 1 loses power.

The power switch circuit illustrated in FIG. 5 is tested by causing the SWITCH TO BUS 2 signal to shift from its normal low state to a high state. When this occurs, the output of G16 again shifts from a low state to a high state. If power is present on a DC bus of ENGINE NO. 2, the output of G17 shifts from a low state to a high state causing the energization of the coil 67 of the power transfer relay 61 and the contact shift described in the preceding paragraph. In addition, current flow through the sense coil 69 of the reed relay current sensor causes the contacts of the reed relay current sensor to close. When this occurs, the test output terminal is grounded. As a result, the automatic test portion of the ATR software subsystem is advised of the correct operation of the power switch circuit.

In summary, both the software ATR subsystem and the hardware ATR subsystem function in substantially the same manner. In essence, both are made operable at the end of the throttle hold period of time. They remain operable for a predetermined period of time, e.g., 100 seconds after throttle hold termination provided also that the aircraft is performing a noise abatement maneuver. The aircraft is assumed to be making a noise abatement maneuver if the thrust of the aircraft's engines are below 70%. If this state of affairs exists, and power is lost from an engine, the ATR system of the invention automatically increases the thrust of the working engine(s) by increasing the throttle setting of the working engine(s). The throttle setting of the disabled engine is not changed. It is up to the pilot to reduce fuel flow to that engine by manually moving the throttle to its minimum power position.

While a preferred embodiment of the invention has been illustrated and described, it will be appreciated that various changes can be made therein without departing from the spirit and scope of the invention. For example, the invention can be utilized with aircraft having three or more engines, if desired. In addition with suitable changes, the invention can also be utilized with auto throttle control systems other than the type schematically illustrated in FIG. 2. Consequently, within the scope of the appended claims, the invention can be practiced otherwise than as specifically described herein.

The embodiments of the invention in which an exclusive property or privilege is claimed are defined as follows:

1. A thrust restoration system for automatically restoring the thrust of the working engine(s) of an aircraft if power is lost by an engine while the aircraft is operating at reduced thrust during a takeoff noise abatement maneuver, wherein each of said engines produces a thrust signal that denotes the thrust produced by the engine and the aircraft produces speed and altitude signals that denote the speed and altitude of the aircraft, said thrust restoration system comprising:
    noise abatement maneuver determining means for receiving said thrust and altitude signals and determining if the aircraft is performing a takeoff noise abatement maneuver;
    engine power loss determining means for receiving said thrust signals and determining if the thrust of any of said engines is below a predetermined level; and,
    engine power restoration means connected to said noise abatement maneuver means and to said engine power loss determining means for increasing power to the working engine(s) of said aircraft if said noise abatement maneuver determining means determines that said aircraft is performing a takeoff noise abatement maneuver and if said engine power loss means determines that the thrust produced by an engine is below said predetermined level.

2. A thrust restoration system as claimed in claim 1, wherein said noise abatement maneuver determining means determines if the thrust of all of said engines is below a predetermined level.

3. A thrust restoration system as claimed in claim 2, wherein said noise abatement maneuver determining means determines if said aircraft is within a predetermined altitude range.

4. A thrust restoration system as claimed in claim 3, wherein said noise abatement maneuver determining means includes a timer that is started a predetermined period of time after the aircraft has taken off and wherein said noise abatement maneuver determining means determines if said aircraft is within said predetermined altitude range by determining if said timer has timed out.

5. A thrust restoration system as claimed in claim 4, wherein said noise abatement maneuver determining means determines if said aircraft altitude is within said predetermined range by analyzing said altitude signal.

6. In an aircraft including an automatic throttle system for controlling the throttle setting and, thus, the thrust produced by the engines of an aircraft, a thrust restoration system forming part of said auto throttle system for automatically restoring the thrust to the working engine(s) of an aircraft if power is lost by an engine while the aircraft is operating at reduced thrust during a takeoff noise abatement maneuver wherein each of said engines produces a thrust signal that denotes the thrust produced by the engine and the aircraft produces speed and altitude signals that denote the speed and altitude of the aircraft, the improvement comprising first and second automatic thrust restoration subsystems, each of said automatic thrust restoration subsystems including:
    noise abatement maneuver determining means for receiving said thrust signals and determining if the aircraft is performing a takeoff noise abatement maneuver;
    engine loss determining means for receiving said thrust signals and determining if thrust has been lost by any of the engines of said aircraft; and
    engine power restoration means connected to said noise abatement maneuvering means and said engine loss determining means for increasing the power of the other engines of said aircraft if said noise abatement maneuver determining means determines that said aircraft is performing a takeoff noise abatement maneuver and said engine power loss determining means determines that the thrust produced by any of the engines of said aircraft has been lost.

7. The improvement claimed in claim 6, wherein each of said noise abatement maneuvering means determines if the thrust of all of the engines of said aircraft area below a predetermined level.

8. The improvement claimed in claim 7, wherein the automatic throttle system of said aircraft produces a throttle hold signal during takeoff and wherein each of said noise abatement maneuvering means receives said throttle hold signal and uses said throttle hold signal along with said thrust signals to determine if said aircraft is performing a noise abatement maneuver.

9. The improvement claimed in claim 8, wherein each of said noise abatement maneuvering means includes a timer that is started when said throttle hold signal ends and terminates after a predetermined period of time during which said noise abatement maneuvering means is enabled to determine if said aircraft is performing a noise abatement maneuver.

* * * * *